Figure 9:
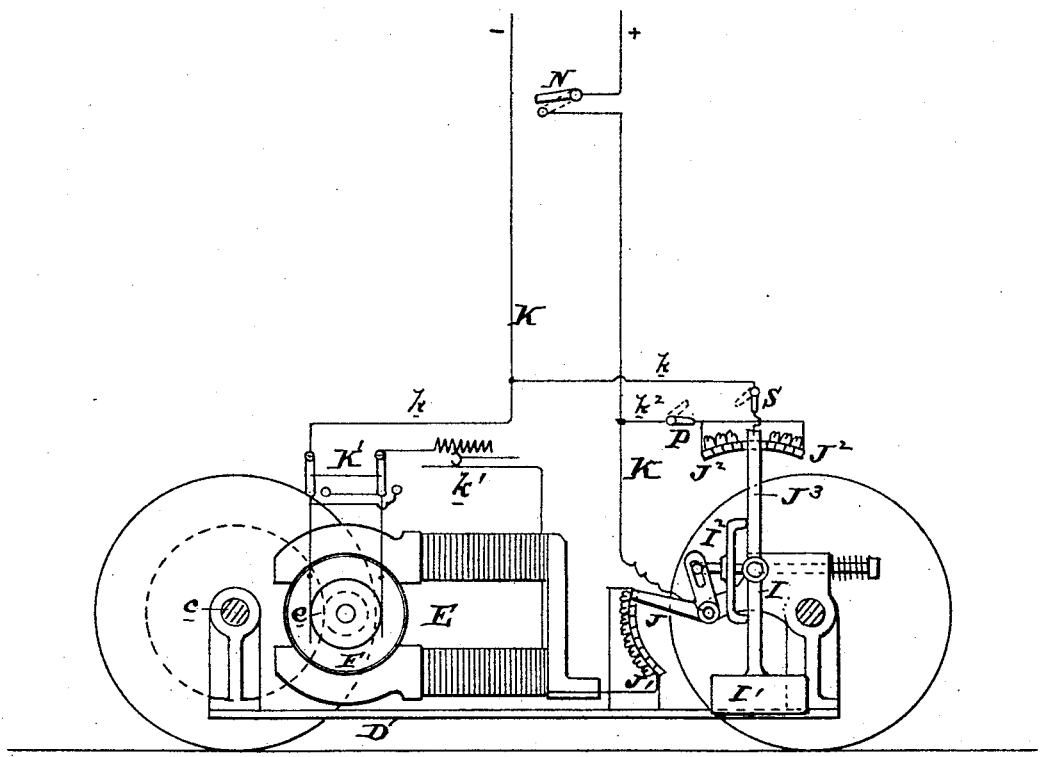

(No Model.) 3 Sheets—Sheet 1.
R. M. HUNTER.
ELECTRIC RAILWAY.
No. 572,706. Patented Dec. 8, 1896.
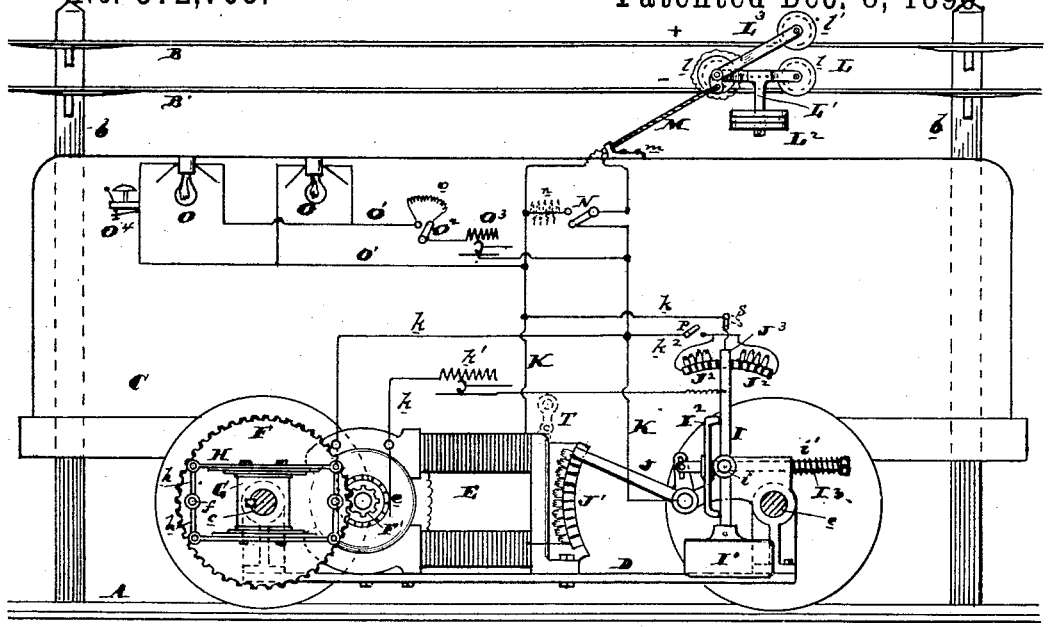
FIG. 1
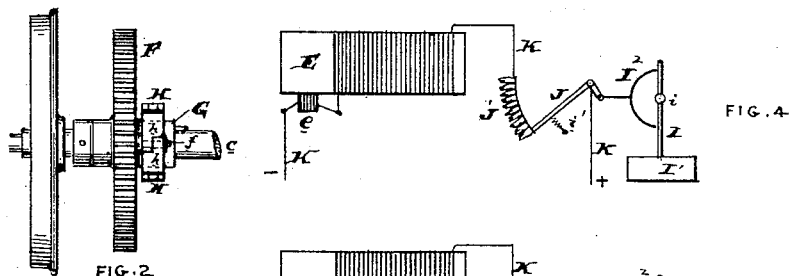
FIG. 3
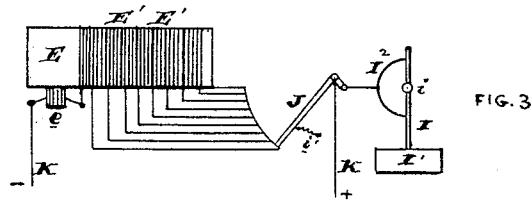
FIG. 2
FIG. 4
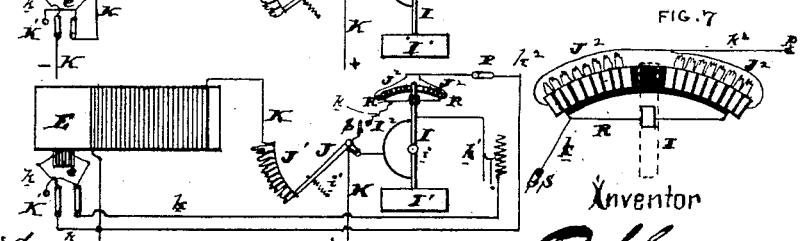
FIG. 5
FIG. 7
FIG. 6
Attest
E. M. Breckinerd
E. McDermott
Inventor
R. M. Hunter

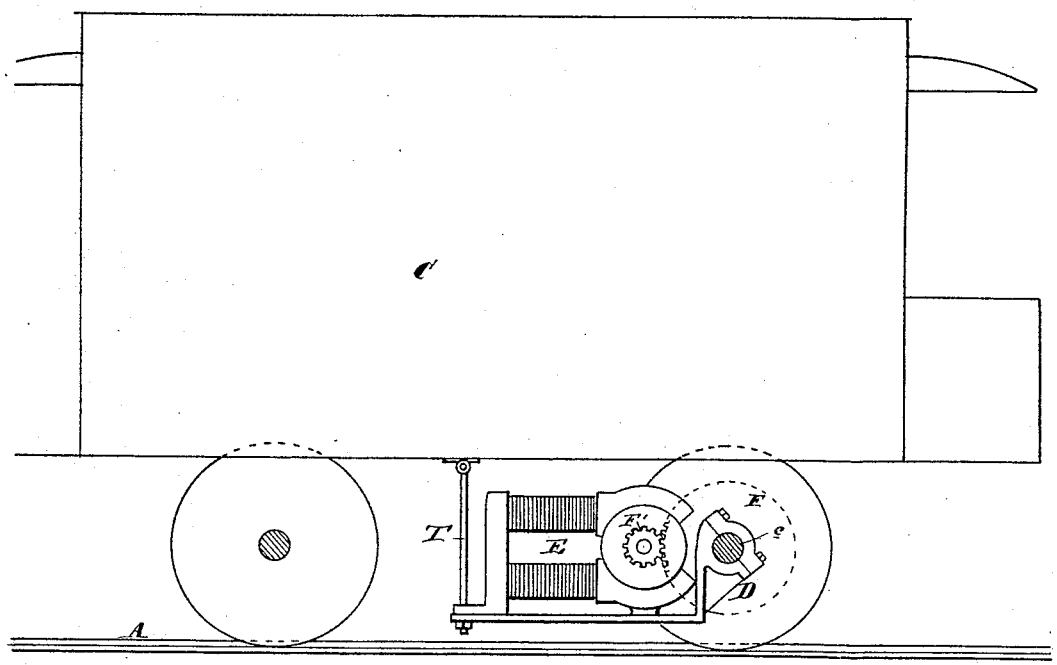

(No Model.)   3 Sheets—Sheet 3.

R. M. HUNTER.
ELECTRIC RAILWAY.

No. 572,706.   Patented Dec. 8, 1896.

Attest
Inventor

UNITED STATES PATENT OFFICE.

RUDOLPH M. HUNTER, OF PHILADELPHIA, PENNSYLVANIA, ASSIGNOR TO THE ELECTRIC CAR COMPANY OF AMERICA, OF SAME PLACE.

ELECTRIC RAILWAY.

SPECIFICATION forming part of Letters Patent No. 572,706, dated December 8, 1896.

Application filed November 4, 1886. Serial No. 217,945. (No model.)

*To all whom it may concern:*

Be it known that I, RUDOLPH M. HUNTER, of the city and county of Philadelphia and State of Pennsylvania, have invented an Improvement in Electric Railways, of which the following is a specification.

My invention has reference to electric railways; and it consists in certain improvements, all of which are fully set forth in the following specification and shown in the accompanying drawings, which form part thereof.

In my application filed September 23, 1886, and serially numbered 214,309, is set out a variety of methods of employing suspended conductors. The general principle of the suspended conductors embodied in this application are also set forth in the above-specified application; but in this application the invention is to be construed as adapted for use with conductors of any kind as applied to electric railways.

In carrying out the invention I provide a suitable carriage or collecting device adapted to run in contact with the working suspended conductors, and from said collecting devices the current is fed to an electric motor supported by the car or vehicle which it is designed to propel. While I prefer to use two suspended conductors for the positive and negative currents, yet it is evident that simply one suspended conductor might be used as the lead and the rails used as the return. The collecting device, of whatsoever kind it may be, is caused to move over the suspended conductor or conductors at the speed commensurate with that of the car or vehicle. The motors on the various cars are connected in multiple-arc connection with the line or supply and return conductors. The motor is connected to the axle by means of suitable gearing or its equivalent, and the power is transmitted through an elastic connection with the axle, whereby the motor-shaft may have a certain amount of freedom in starting.

In carrying out this invention I provide a pinion on the motor-shaft, which engages with a spur-wheel loosely supported upon the car-axle, but connected thereto through the mediation of suitable springs. It is self-evident that in place of the said springs being interposed between the spur-wheels and axle they might be interposed between the pinion and its shaft, the principle, object, and effect being identical in both cases. As a car mounts an incline the work required of the motor is gradually increased, and to increase the power necessary for this increased work I provide a suitable regulating device to control the strength of the field-magnets, and this regulating apparatus is made automatic through the action of gravity upon a weighted lever, which may directly or indirectly control the regulating apparatus to change the resistance of the field-magnet circuit, which may be done by inserting or removing external resistances or by cutting out or in more or less of the coils composing the field-magnets, and thereby changing the strength of the field. With this improved apparatus the strength of the field is automatically increased or decreased in accordance with requirements, which change is proportional to the grade to be mounted. The armature-circuit may be in series or multiple-arc connection with the field and provided with an auxiliary resistance-changer. By this construction the motor regulates its power for uniform speed independently of the operator. In coming down a grade, particularly if the same be long, there will be a tendency to a gradual acceleration in the speed of the vehicle. To prevent this, I provide a suitable short-circuiting device for the armature-circuit and an automatic resistance-changer controlled by gravity, which shall insert an increased resistance into said armature-circuit in accordance with the increase in grade, or vice versa. By this means the motor is converted into a generator and is made to expend its work in overcoming the resistances inserted in the armature-circuit.

The foregoing gives the general features of invention; but there are others of less importance which are enumerated in details hereinafter.

In the drawings, Figure 1 is a sectional elevation of an electric railway and vehicle embodying my invention. Fig. 2 is an end elevation showing the connection of the power-wheel to the axle. Figs. 3 to 6, inclusive, are diagrams showing different methods of coupling up the circuits for the motor and the arrangement of the controlling mechanism. Fig. 7 is an elevation of the armature-circuit resistances used when the armature is short-circuited and is similar to that shown on a small scale in Fig. 6. Fig. 8 is a diagram showing a modified way of connecting the motor to the car, and Fig. 9 is a diagram illustrating in elevation the circuits of my invention when a series motor is employed.

A is the road-bed or rails.

B is the positive and B' the negative suspended conductor and are shown as hung or suspended from short posts $b$. These suspended conductors may be made of any material and suspended in any manner desired.

C is the electrically-propelled vehicle or car, and has its axle $c$ connected by spur-gear F with pinion F' on the shaft of the electric motor E. The spur-wheel F is loosely supported on the axle $c$ and has pins or studs $f$, to which are hinged links $h$. The other ends of these links are connected to the outer or free ends of the plate-springs H H, which are bolted to the block G, keyed or otherwise connected to the axle $c$. By this construction it will be seen that the wheel F (which may be a power-wheel of any description) is connected to the axle by an elastic connection, which will have the effect of allowing the motor-shaft to turn slightly before putting the axle into rotation. This reduces the wear and tear of the parts, eliminates much of the noise, and greatly increases the available power of the motor at starting.

In place of the pinion and spur-wheel I may employ any other equivalent power-transmitting device, such, for instance, as a band or chain; but in all cases a power-wheel would be used. The springs H (here shown) are made up of flat steel plates very similar to carriage or wagon springs, and, if desired, they might have the elliptical shape so common in carriage-springs given to them. Any other form of spring may be used, such, for instance, as coiled, helical, spiral, or other well-known forms.

The motor E is supported upon a frame D, which is pivoted or hinged to the axles; but it is evident that it might simply be hinged to the axle $c$, carrying the wheel F, and allow the motor to hang from the car body or frame by link T, preferably at a point midway between the axles, as shown in Fig. 8.

L is the current-collecting device and runs in contact with the conductors. It may be of any form or construction and connected to the car in any manner, but is caused to be moved over the conductors by the car. As shown, it consists of a carriage L', having two grooved supporting and collecting wheels $l$, which run upon the conductor, and the carriage is held in a vertical position and good contact insured by a weight $L^2$, which may be increased or decreased, as desired. Hinged to this carriage is a bell-crank $L^3$, carrying a collecting-roller $l'$ at the end of one arm, while the other arm is connected to the traction cord, rod, or cable M, which may also form the conductors to the motor. This cord is secured to a plate $m$ on the top of the car. By this construction of collector it will be seen that the traction causes the wheels to follow the conductors, the resultant line of traction being back of the forward wheel of the carriage and back of the hinge-point of the lever $L^3$.

K is the motor-circuit and includes the motor E on the car. The motor may be cut out by a switch N by breaking the motor-circuit, or the switch may cut out the motor and insert an auxiliary resistance $n$ equal to that of the motor, or may simply form a bridge between the collectors. The insertion of the resistance $n$ is most desirable, as then we have the resistances connecting the two working conductors kept practically uniform, and consequently but little fluctuation in the line-resistance need result.

J' is a resistance-changer in the field-magnet circuit.

J is a switch-lever to cut in or out said resistances and is operated by a slide $I^3$, drawn in one direction by a spring $i'$ and in the other by a pivoted lever I, which acts upon slide $I^3$ by means of its arms or cross-bar $I^2$, which extends above and below the fulcrum-point $i$ of the lever I and rests in contact with said lever. By oscillating the lever I to either side the arm $I^2$ and its slide will be moved back and the switch J will be shifted, cutting out more or less of the resistances. This lever I is weighted, as at I', and when the car is on a level the switch J is fully raised and all of the resistance J' is in circuit. As the car runs onto an upgrade the resistances are cut out in proportion to the grade, and as the grade lessens the resistances are cut in again. This is to increase the power of the motor in mounting such grades and causes the regulation to take place automatically in accordance with the demand. In mounting grades the work to be overcome increases greatly, and at these places, the speed not being easily maintained, the electrical efficiency is reduced, but the work performed is greatly increased.

In place of using external resistances in the field-circuit the field-magnet coils may be made in sections or so connected that the switch J will cut in or out more or less of them to vary the power of the field, as shown in Fig. 3.

In Fig. 4 the armature and field are connected in series, while in Figs. 1 and 6 the field is in shunt connection with the armature, $k$ being the armature-circuit, K' the current-reversing switch, and $k'$ the armature-resistance changer, which may be operated independently of the field-resistance changer J'. Beside the armature-circuit $k$ there is a short-circuiting circuit $k^2$, by which the armature may be short-circuited when it is used as a dynamo-brake.

In Fig. 1 the armature-circuit is shown as including the lever I, the upper end $J^3$ of which sweeps the resistances $J^2$, a set of which are arranged upon each side of the normal or vertical position of the lever I. As shown, these resistances $J^2$ are in circuit with the short-circuit circuit $k^2$, which is further provided with a circuit-breaker P. The armature-circuit $k$ is also provided with a circuit-breaker S. When the switch P is open and switch S closed, the armature is in multiple-arc connection with the field-magnets; but if switch P is closed and switch S open then the armature is short-circuited and the motor becomes a dynamo with an externally-excited field and acts to arrest the travel of the car, as the rotation of the armature is then only due to the momentum of the car and the action of the motor as a dynamo tends to arrest the rotation of the armature.

In Fig. 9 are shown the circuits when the motor to propel the car or vehicle is a series motor. From this it will be perceived that the general arrangement of the circuits is the same as in Fig. 1, that is to say, the switch N cuts the motor from the line, and switches P S insure the motor being short-circuited when they are arranged as shown. The reversing-switch reverses the polarity of the armature relatively to the field. The resistance to the armature may be varied by hand by resistance-changer $k'$ or automatically by the resistance $J'$ and $J^2$, as before.

When the car is going down a grade, it is advisable to short-circuit the armature of the motor, and when this is done the gravity-actuated lever I will automatically act to insert more or less of the resistances $J^2$ into said short circuit of the armature, and the resistance to the forced revolution of the armature is thus automatically increased, and from the construction shown it is evident that this resistance to revolution is increased proportionally to the grade to be descended. To increase this braking action, the power of the field will also be automatically increased, thereby also offering a proportional resistance to the rotation of the armature. It will thus be seen that the switches P and S control whether or not the motor shall be made to exert a propelling or retarding action, and in either case the automatic gravity-controlling device for the power of the field-magnets acts in accordance with the requirement—that is, to assist the car up a grade or resist its rapid descent down a grade.

The construction shown in Figs. 6 and 7 is substantially the same as that of Fig. 1. In this case the top of the lever I sweeps a contact-plate R, which is in circuit with the armature-circuit $k$ if switch S is closed. In these figures the switch J cuts out or in the resistances $J'$, as in the case of Fig. 1. If the car is on a downgrade and it is desired to operate the motor as a dynamo, then the switch S, being opened, no current will come from positive conductor K through the armature-circuit $k$ and armature to negative conductor K, as it did before; but now the armature-circuit $k$ will include the resistances $J^2$ and the armature will be short-circuited and operate to generate a current to be expended in the resistances $J^2$. At the same time the field will be made stronger, so as to increase the counter electromotive force, and the motor produces a braking effect to arrest the too-rapid running of the car. The resistances $J^2$ are put on each side of the normal line of the lever I, so that either end might be used as front, though this is not necessary.

In Figs. 6 and 7 the lever I is shown as part of the armature-circuit, both normally and when short-circuited. When running on level track, the switch S would be closed and the armature regulated by regulator $k'$.

The details of construction may be modified or varied in numerous ways without departing from the essence of the invention. Hence I do not limit myself to the constructions here shown.

By this mechanism the main regulation for varying duties in railways having grades will be automatically controlled and the operation will only be required to govern the speeds or to vary the power for a given speed to compensate for varying loads or time lost in stopping to take on passengers.

$O'$ is a derived circuit on the car, receiving current from the motor-circuit K, and may have a regulator $O^3$ to control the amount of current flowing over this derived circuit.

O O are lamps in the circuit $O'$. $O^4$ represents an electric signal-bell. A very high resistance $o$ is in the derived circuit and may be cut in or out by a switch $o^2$. This switch $o^2$ is used to cut the lamps or the signal, or both, (if used in same circuit,) out by interposing so great a resistance as to prevent an operative current passing.

I do not limit myself to the details, as they may be modified in various ways without departing from my invention.

Having now described my invention, what I claim as new, and desire to secure by Letters Patent, is—

1. In an electric vehicle, the combination of an electric motor mechanically connected to propel the vehicle, a reversing-switch mechanically independent of the motor-brushes to reverse the polarity of one of the elements of the motor, motor-circuits on the car for supplying current to the motor from a source of electric supply, a switch for cutting the motor from the source of electric supply, and switch devices for short-circuiting the armature and field-magnets and maintaining them in series to make the motor act as a generator to arrest or retard the movement of the car.

2. The combination of a vehicle, an electric motor having a frame by which it is sleeved to one of the axles of the vehicle, spur-gearing between the axle and the motor-shaft, and an elastic connection between the gearing and the axle consisting of leaf-springs connected to the axle at one end and to the spur-wheel at the other end.

3. The combination of a car, a source of electric energy, a series electric motor to propel the car, a reversing-switch for one of the elements of the motor, means to short-circuit the motor as an entirety relatively to the source of energy, and means consisting of adjustable resistances in series with the armature and field-magnet when short-circuited.

4. In an electric car, the combination of an electric motor to propel the car, circuits on the car for supplying current to the motor, and switch devices to cut the entire motor out of circuit and to short-circuit the armature and field-magnet in series through an adjustable resistance.

5. In an electric car the combination of an electric motor to propel the car, circuits on the car for supplying current to the motor, a switch to short-circuit the motor as an entirety, a variable resistance in series with the armature and field-magnets against which the short-circuited motor is required to force the current generated in its moving element, and a reversing-switch for reversing the current in one of the elements of the motor.

6. In an electric railway the combination of an electrically-propelled vehicle, an electric motor on said vehicle, a motor-circuit a source of electric supply, an electric-light circuit in multiple-arc connection with the motor one or more electric lamps in said circuit, a light-extinguishing resistance and a switch to cut in or out said light-extinguishing resistance.

7. In an electric railway, outgoing and return conductors extending along the railway, a car, an electric motor to propel the car, traveling contacts with the car for supplying current from the conductor to the motor on the car, means for simultaneously short-circuiting the field-magnets and armature of the motor, a variable resistance against which the motor works when short-circuited, and a switch for reversing the motor while maintaining the field-magnets and armature in series.

8. The combination of a railway, a line conductor extending along the railway, a traveling vehicle, an electric motor for propelling the vehicle carried by the axles, an automatic current-regulator for the motor carried by the axles independent of the vehicle-body so as not to be affected by the vibrations of the car-body and a current-collecting device moving with the vehicle for making a traveling connection with the conductor and supplying current to the regulator and motor extending from the line conductor to the regulator and motor, and a mechanical connection between said collecting device and vehicle-body at a point between the line conductor and regulator and motor.

9. The combination of a vehicle, an electric motor to propel said vehicle, a source of electric energy, a regulator consisting of a resistance-changer in series with the coils of the field-magnet, electric circuits from the source of energy to the motor, a reversing-switch for the armature independent of the resistance-changer, and an automatic gravity-actuated lever or pendulum to vary the resistance of the resistance-changer in accordance with the inclination of the vehicle in going up a grade.

10. The combination of an electrically-propelled vehicle, an electric motor on the vehicle, a source of electric power, circuits for supplying current to the motor on the vehicle, a regulator for controlling the current flowing through the motor, a pivoted lever carried by the axle independent of the car-body so as not to be affected by the swinging of the car-body and weighted at its lower part, and a connection between the resistance-changer and pivoted lever.

11. In an electric railway, the combination of a source of electric supply, an electrically-propelled vehicle, an electric motor having circuits maintaining its field-magnet and armature in fixed series relation, a motor-circuit, a regulator to control the power of the motor, and gravity-actuated means on the car to directly control the regulator.

12. In an electrically-propelled vehicle, the combination of an electric motor to propel the vehicle, a reversing-switch for the armature of the motor, a switch for short-circuiting the armature while maintaining it in series with the field-magnets, circuits for maintaining the field-magnets in magnetized condition, and adjustable resistances adapted to be interposed in the armature-circuit to vary the resistance of the armature to rotation when acting as a brake to arrest or retard the vehicle.

13. In an electric railway, the combination of a source of electric supply, an electrically-propelled vehicle having a car-body on springs, an electric motor on said vehicle, a switch to control the current in the armature, and automatic gravity-actuated mechanism carried upon the axles independent of the car-body to actuate said switch.

14. The combination of the vehicle, an electric motor on said vehicle, a switch J to control the power of the motor, a gravity-actuated lever I carried by the axles independent of the car-body, and a connection between said switch J and lever I whereby the switch is automatically moved.

15. The combination of the vehicle, an electric motor on said vehicle, a switch to control the power of the motor, a gravity-actuated lever pivoted at the middle on a transverse axis, and a connection between said switch and lever both above and below the middle pivot so that a movement of lever either forward or backward will move the switch in the same direction.

16. In an electric railway, an outgoing conductor, in combination with a traveling vehicle, a current-collecting device carried with the vehicle and making a traveling contact with the outgoing conductor, an electric motor to propel the vehicle journaled to the axle which it rotates and having its free end movably supported relatively to the axles, a motor-circuit between the collecting device and motor, an elastic mechanical power-transmitting connection between the motor-shaft and axle whereby the motor may obtain a portion of a revolution before the collector and vehicle are moved, a return-circuit extending along the railway, and a suitable contact device moving with the vehicle for the return-circuit.

17. The combination of the axle $c$, the springs H H secured thereto, a power-wheel loosely supported on the axle, pins or studs $f$ on said power-wheel, links $h$ connecting the springs with the pins or studs, an electric motor E, and power-transmitting mechanism between said motor and power-wheel.

18. In an electrically-propelled vehicle the combination of the axle, the power-wheel loosely supported thereon, a spring formed of flat steel plates secured to the axle, and connected at its free end to the power-wheel, the electric motor, and a connection between the motor-shaft and power-wheel.

19. The herein-described method of braking an electrically-propelled car which consists in cutting the motor out of the line-circuit, short-circuiting the field and armature while maintaining them in series relation, and gradually decreasing the resistance in the short circuit.

In testimony of which invention I hereunto set my hand.

RUDOLPH M. HUNTER.

Witnesses:
RICHD. S. CHILD, Jr.,
E. M. BRECKINREED.